Dec. 21, 1926.

H. S. DILLS

ARTIFICIAL BAIT

Filed May 20, 1925

1,611,635

Inventor

H. S. Dills

By Eccleston & Eccleston
Attorneys

Patented Dec. 21, 1926.

1,611,635

UNITED STATES PATENT OFFICE.

HENRY S. DILLS, OF GARRETT, INDIANA, ASSIGNOR TO THE CREEK CHUB BAIT CO., OF GARRETT, INDIANA, A CORPORATION OF INDIANA.

ARTIFICIAL BAIT.

Application filed May 20, 1925. Serial No. 31,572.

This invention relates to fish bait and more especially to an artificial bait or lure designed to represent a crawfish or the like and so constructed as to simulate the movements of a crawfish when the lure is drawn through the water.

It is an object of the present invention to provide an inexpensive yet practical construction of artificial bait including a plurality of resilient elements so positioned with respect to the body of the lure that when the latter is drawn through the water it will assume a life-like appearance thereby greatly enchancing its value as a fish lure.

It is realized of course, that fish lures have heretofore been devised in which feathers and the like have been employed to attract the fish, but the present invention is designed to generally improve such prior constructions by creating a more life-like appearance in the lure when it is in use.

Figure 1:
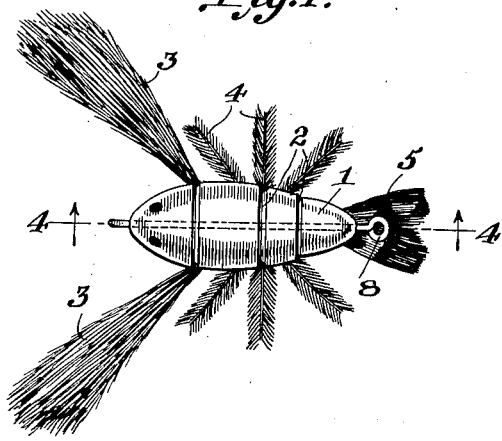
Figure 2:
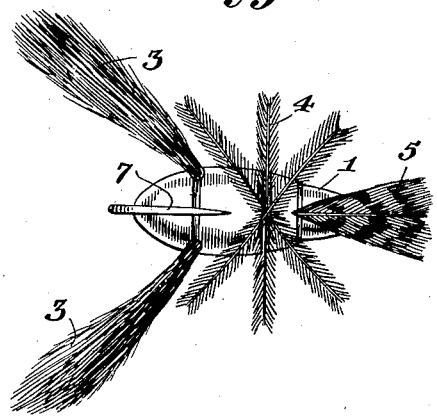
Figure 3:
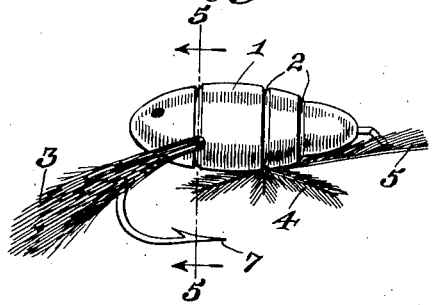
Figure 4:
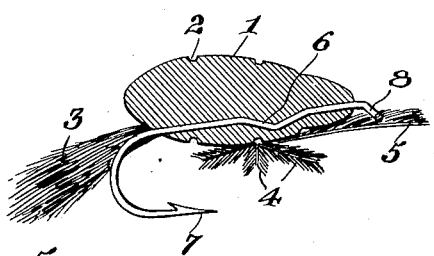
Figure 5:
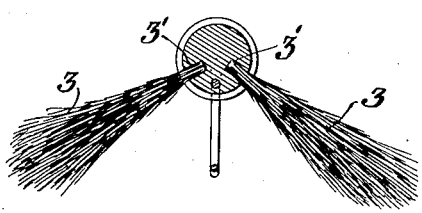

Other objects and advantages of the invention will be apparent from the following description when taken in connection with the accompanying drawings, in which:

Figure 1 is a top plan view of the lure.
Figure 2 is a bottom plan view thereof.
Figure 3 is a side elevation of the lure.
Figure 4 is a longitudinal section taken on line 4—4 of Figure 1; and
Figure 5 is a cross section taken on line 5—5 of Figure 3.

Referring to the drawings more in detail, the numeral 1 indicates the body of the lure which is formed of any desirable and appropriate material, and which is grooved as indicated by numeral 2 and otherwise designed to represent the body of a crawfish.

An essential feature of the invention, as stated above, resides in the production of an artificial bait which will simulate the movements of a crawfish or the like, and to this end I have attached claws, legs and a tail to the body as will now be described in detail.

The claws are indicated by reference numeral 3 and may be composed of elongated tufts of hair such as squirrel tails or the like which are glued in recesses formed in the body portion and designated by the numeral 3'. It will be noted from an inspection of the several figures of the drawings that these tufts 3 incline downwardly and outwardly in the same manner as the claws of a crawfish and in close simulation thereof, and due to the resiliency of the material of which they are formed, will be caused to assume varying positions when the lure is put in operation.

The legs and tail of the lure are indicated by numerals 4 and 5 respectively, and are also positioned on the body so as to provide a close representation of a crawfish. Both the legs and tail are constructed of feathers and therefore are sufficiently resilient to assume varying positions with respect to the body portion 1 when the lure is in use. It should be particularly noted that the feather 5 is relatively wide in simulation of a crawfish tail and that when the lure is drawn through the water the element 5 will be flexed backwardly in identically the same manner as the tail of a crawfish thereby producing a very life-like simulation of this species of crab.

The fish hook 6 is molded or otherwise fixedly secured to the body portion 1 with the point 7 of the hook extending below the body portion; and the eye 8 to which the line is attached being positioned directly above the tail 5.

From the foregoing description taken in connection with the accompanying drawings it will be observed that I have devised a rather simple and inexpensive construction of fish lure which provides a close simulation of a crawfish, and which when in actual use will present a very life-like aspect of the natural animal.

In accordance with the patent statutes I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. In combination with the body of a fish bait or lure designed to represent the body of a crawfish and having a fish-hook connected thereto, a relatively wide and flat feather secured to the body and extending forwardly and in alignment with the lure in representation of the tail of a crawfish, whereby when the lure is drawn through the water the feather will flare backwardly in simulation of a crawfish when swimming.

2. In combination with the body of a fish bait or lure designed to represent the body of a crawfish and having a fish-hook connected thereto, a feather secured to the forward end of the body portion in alignment therewith and extending beyond the said end, whereby the feather will flare backwardly in simulation of a crawfish.

3. In combination with the body of a fish bait or lure designed to represent the body of a crawfish and having a fish hook attached thereto, a feather secured to the forward end of the body portion in alignment therewith and extending beyond the said end, and an elongated tuft of hair attached to each side of the body adjacent the rear end thereof and extending rearwardly and at an angle therewith.

4. In combination with the body of a fish bait or lure having a fish hook extending longitudinally therethrough with the hook projecting below the body at one end, an elongated tuft of hair attached to each side of the body adjacent the rear end thereof and extending rearwardly and at an angle therewith, and a plurality of legs formed of feathers attached to the underside of the body portion in simulation of a crawfish.

5. In combination with the body of a fish bait or lure having a fish hook extending longitudinally therethrough with the hook projecting below the body at one end, an elongated tuft of hair attached to each side of the body adjacent the rear end thereof and extending rearwardly and at an angle therewith, a feather secured to the forward end of the body portion and extending beyond the said end, and a plurality of legs formed of feathers attached to the underside of the body portion in simulation of a crawfish.

6. In an artificial bait or lure, a body portion designed to represent the body of a crawfish and provided with a plurality of circular grooves, a fish hook rigidly connected to said body portion, an elongated tuft of hair attached to each side of the body adjacent the rear end thereof and extending rearwardly and at an angle therewith, a feather secured to the forward end of the body portion and extending beyond the said end, and a plurality of legs formed of feathers attached to the underside of the body portion.

HENRY S. DILLS.